United States Patent
Chang et al.

(10) Patent No.: US 12,554,853 B2
(45) Date of Patent: Feb. 17, 2026

(54) ANOMALY DETECTION DEVICE AND METHOD BY UTILIZING DATA AUGMENTATION

(71) Applicant: TXONE NETWORKS INC., Hsinchu (TW)

(72) Inventors: Min-Hsin Chang, Hsinchu (TW); Han-Chang Liang, Hsinchu (TW); Sheng-Kai Lin, Hsinchu (TW)

(73) Assignee: TXONE NETWORKS INC., Hsinchu (TW)

( * ) Notice: Subject to any disclaimer, the term of this patent is extended or adjusted under 35 U.S.C. 154(b) by 28 days.

(21) Appl. No.: 18/918,899

(22) Filed: Oct. 17, 2024

(65) Prior Publication Data
US 2025/0390575 A1 Dec. 25, 2025

(30) Foreign Application Priority Data
Jun. 21, 2024 (TW) ................. 113123272

(51) Int. Cl.
*G06F 21/00* (2013.01)
*G06F 21/56* (2013.01)
*G06N 3/09* (2023.01)

(52) U.S. Cl.
CPC ............ *G06F 21/566* (2013.01); *G06N 3/09* (2023.01); *G06F 2221/034* (2013.01)

(58) Field of Classification Search
CPC .... G06F 21/566; G06F 2221/034; G06N 3/09
See application file for complete search history.

(56) References Cited

U.S. PATENT DOCUMENTS 10,419,468 B2 * 9/2019 Glatfelter ............ H04W 12/122
2021/0334656 A1 * 10/2021 Sjögren .................. G06F 18/22

* cited by examiner

*Primary Examiner* — Rodman Alexander Mahmoudi
(74) *Attorney, Agent, or Firm* — HDLS IPR SERVICES; Chun-Ming Shih

(57) ABSTRACT

An anomaly detection device (100) by utilizing data augmentation is disclosed, which includes a continuous data collection module (110) and a processor (120). The processor (120) executes following steps for each of collected multiple data records (d1-dM): executing an activation-status determination on multiple behavior data by utilizing corresponding activation functions with respect to multiple behavior types and generating a set of the behavior types specific to each subject; for each subject, performing data augmentation by enumerating multiple mathematical combinations of the behavior types; using outputs of the data augmentation as inputs of a learning function to train the machine learning model (BM) of baseline behavior features; and using new outputs of the data augmentation according to all new data record captured from the testing subject during a predefined time range by the continuous data collection module (110) as inputs of a predict function to perform anomaly detect.

14 Claims, 8 Drawing Sheets

ANOMALY DETECTION DEVICE AND METHOD BY UTILIZING DATA AUGMENTATION

BACKGROUND OF THE DISCLOSURE

Technical Field

The disclosure relates to information security technology, particularly relates to an anomaly detection device and method by utilizing data augmentation.

Description of Related Art

In a current information security field, in addition to computer virus attacks or Trojan horse program attacks, various gray behaviors or graywares still exist in various network environments, network programs, or processing systems. The gray behaviors or the graywares generally refer to all suspicious behaviors or software with suspicious behaviors that are considered not to be computer viruses or Trojan horse programs but may negatively affect performance of various network environments, network programs, and processing systems, thereby compromising information security. However, in the current information security field, subjects or data with the gray behaviors or the graywares still cannot be effectively identified as benign or abnormal.

In addition, in a zero-trust environment, individual software resources (e.g., software programs or firmware programs) of systems, systems (e.g., network systems or wireless communication systems) used by users, and enterprise assets themselves (e.g., companies themself, factory, or machines) are deemed as the subject to verify various accesses in the subject, rather than simply verifying the system individual software resources, the systems used by the users, and owners or access locations of the enterprise assets themselves. In other words, in the zero-trust environment, before each user needs to access every resource of enterprise, these individual access behaviors must be verified. However, in the current information security field, the gray behaviors or the graywares still cannot be effectively identified as passing verification or failing verification in the zero-trust environment.

SUMMARY OF THE INVENTION

Purpose of the disclosure is to provide an anomaly detection device and method utilizing data augmentation, which greatly saves human resources in collecting data and greatly improves accuracy of abnormality detection of gray behaviors.

In order to achieve the above purpose, the disclosure provides the anomaly detection device by utilizing data augmentation, including:
- a continuous data collection module, configured in a training environment supervised to ensure normal operations or in a regular operation environment, for capturing multiple data records of multiple subjects, where each of the multiple data records respectively comprises time, a subject, multiple behavior types, and multiple behavior data respectively corresponding to the multiple behavior types;
- a memory, configured for storing multiple instructions and a machine learning model of baseline behavior features, which implements:
  a) a learning function that takes a set of the behavior types of predefined length N as input, and adds the set to the baseline behavior features;
  b) a predict function that takes a new set of the behavior types of the predefined length N as input, and outputs a matched status;
- a processor, connected to the continuous data collection module and the memory, and configured for executing the multiple instructions to execute following steps for each of the multiple data records:
  executing an activation-status determination on the multiple behavior data by utilizing corresponding activation functions with respect to the behavior types, and combining all the behavior types that are in activated state for each subject to generate the set of the behavior types specific to each subject, where the set represents behavior features of each corresponding subject;
  based on the predefined length N used in the machine learning model of baseline behavior features, for each subject, performing data augmentation by enumerating all mathematical combinations of the predefined length N in the set of the behavior types, where each of the mathematical combinations is a subset, of the predefined length N, of the behavior features of the subject;
  in the case of the training environment, after finishing a data collection training, using outputs of the data augmentation as inputs of the learning function to train the machine learning model of baseline behavior features during a model training; and
  in the case of the regular operation environment, using new outputs of the data augmentation according to all new data records captured from a testing subject within a predefined time range by the continuous data collection module as inputs of the predict function, and indicating an anomaly event if the predict function returns the matched status indicating abnormal.

In order to achieve the above purpose, the disclosure also provides the anomaly detection method by utilizing data augmentation, including:
- by a continuous data collection module, in a training environment supervised to ensure normal operations or in a regular operation environment, capturing multiple data records (d1-dM) of multiple subjects, where each of the multiple data records respectively comprises time, a subject, multiple behavior types, and multiple behavior data respectively corresponding to the multiple behavior types;
- for each of the multiple data records, by a processor, executing an activation-status determination on the multiple behavior data by utilizing corresponding activation functions with respect to the behavior types, and combining all the behavior types that are in activated state for each subject to generate the set of the behavior types specific to each subject, where the set represents behavior features of each corresponding subject;
- for each of the multiple data records, by the processor, based on the predefined length N used in the machine learning model of baseline behavior features, for each subject, performing data augmentation by enumerating all mathematical combinations of the predefined length N in the set of the behavior types, where each of the mathematical combinations is a subset, of the predefined length N, of the behavior features of the subject;
- in the case of the training environment, after finishing a data collection training, by the processor, using outputs of the data augmentation as inputs of a learning function to train the machine learning model of baseline behavior features during a model training, where the learning function takes the set of the behavior types of the predefined length N as input, and adds the set to the baseline behavior features; and in the case of the regular operation environment, by the processor, using new outputs of the data augmentation according to all new data records captured from a testing subject within a predefined time range by the continuous data collection module as inputs of a predict function, and indicating an anomaly event if the predict function returns the matched status indicating abnormal, where the predict function takes a new set of the new behavior types of the predefined length N as input, and outputs the matched status.

Compared with related technology, an achievable technical effect of the disclosure is that the disclosure directly uses combination processing to perform the data augmentation to greatly save human resources in collecting data and greatly improve accuracy of abnormal detection of gray behaviors.

DETAILED DESCRIPTION

In a current information security field, gray behaviors are very difficult to identify. In addition, many benign subjects or data often have gray behaviors, and these benign subjects or data are often mistaken for abnormalities because of having these gray behaviors. Furthermore, due to difficulty in determining whether the gray behaviors generated by subjects are benign or malicious, information security systems often adopt overly loose or overly strict policies to identify gray behaviors. However, if the information security systems adopt the overly loose policies (e.g., a whitelist), benign behaviors in the whitelist are possibly exploited by vulnerabilities or become tools for malware to perform cyber attacks. If the information security system adopts the overly strict policies, a large number of false alerts are generated easily, thereby wasting time for a system administrator to confirm the false alerts.

In addition, in a current zero-trust architecture, although the information security systems reduce information security risks by verifying the subjects generating the gray behaviors, the information security systems setting verification items required for the gray behaviors is often very cumbersome. Besides, if the information security systems adopt overly loose or overly strict verification settings, weaknesses in the zero-trust architecture are also possibly generated.

In order to solve the above problems, the disclosure proposes an anomaly detection device and method utilizing data augmentation, which uses a concept of mathematical combination to perform data augmentation. Furthermore, compared with focusing on the individual gray behavior, the disclosure collects all data records of benign subjects during a period of time to perform activation status determination on all behavior data in these data records, and through a manner of mathematical combination, generates all mathematical combinations based on all behavior types in activated state to perform the data augmentation. In this way, the anomaly detection device and method utilize an extremely large number of the mathematical combinations to perform anomaly detection in the zero-trust environment to achieve an effect of accurately detecting whether the gray behaviors are abnormal. In addition, this anomaly detection device and method also utilize a technical feature of verification value detection to detect abnormalities on a test subject, so as to achieve an effect of accurately detecting whether the test subject is abnormal.

Embodiments of the Anomaly Detection Device Utilizing Data Augmentation

Figure 1:
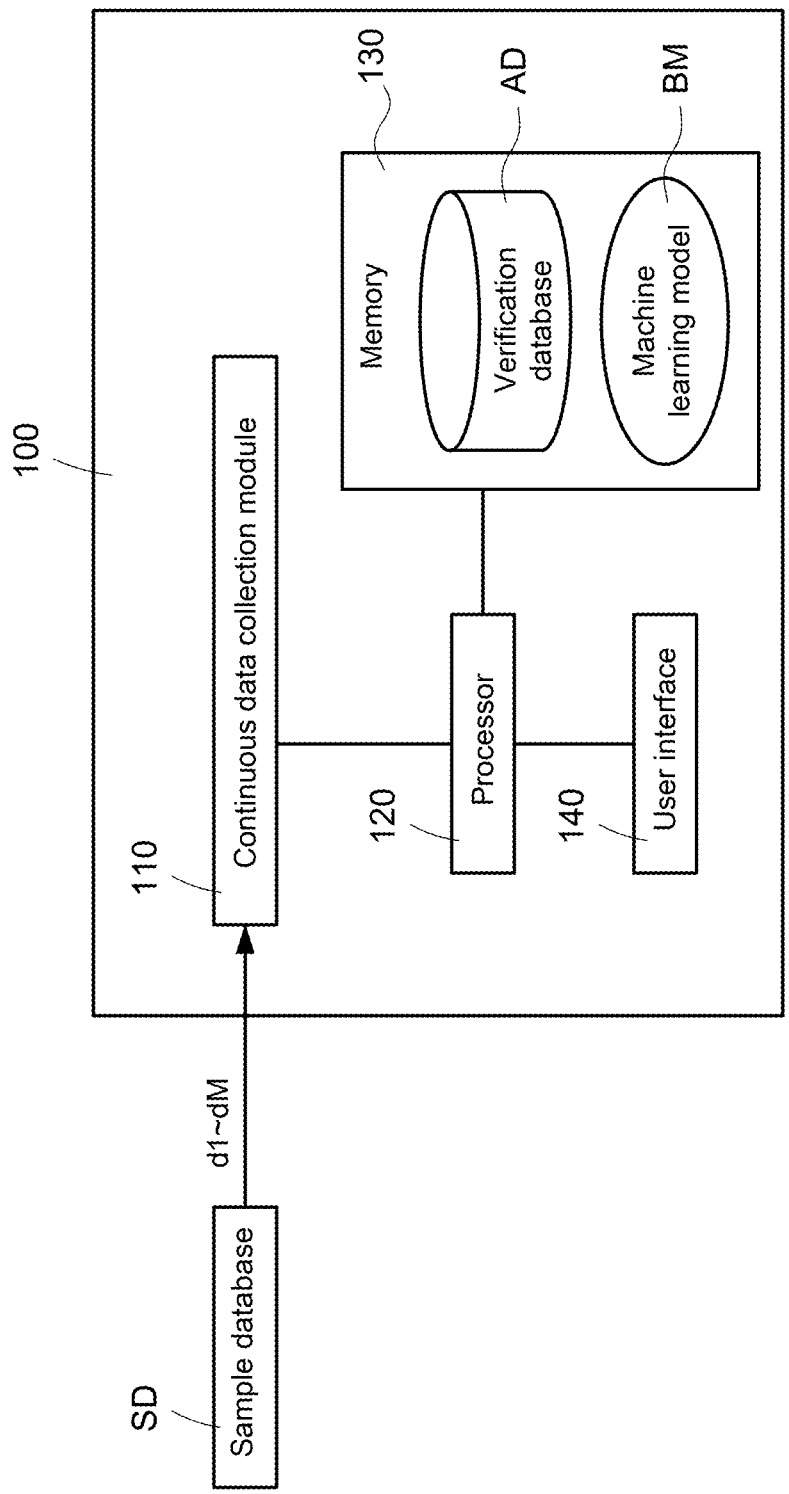
FIG. 1 is a block diagram of an anomaly detection device utilizing data augmentation in some embodiments of the disclosure.

Reference is made to FIG. 1, and FIG. 1 is a block diagram of an anomaly detection device 100 utilizing data augmentation in some embodiments of the disclosure. The anomaly detection device 100 is implemented by any electronic device or server (e.g., a processing device, a cloud device, a server, or a cloud server of an individual user or an enterprise), and the anomaly detection device 100 is connected to a network in the zero-trust environment. As shown in FIG. 1, the anomaly detection device 100 includes a continuous data collection module 110, a processor 120, and a memory 130. The processor 110 is connected to the continuous data collection module 110 and the memory 130.

In this embodiment, the continuous data collection module 110 is used for capturing multiple data records d1-dM of multiple subjects in a training environment supervised to ensure normal operations or a regular operation environment, where each of the data records d1-dM includes time, a subject, multiple behavior types, and multiple behavior data respectively corresponding to the multiple behavior types, where one behavior type possibly includes multiple behavior data at the same time. In addition, this training environment supervised to ensure normal operations is an environment used in a phase of collecting multiple data records d1-dM that are known to belong to multiple benign subjects, and this regular operation environment is an environment used in a phase of anomaly detection for a test subject that are unknown to be benign or malicious. It should be noted that M is any positive integer and there are no special restrictions.

Specifically, the continuous data collection module 110 is only used for capturing the data records d1-dM in the training environment supervised to ensure normal operations or the regular operation environment, but cannot identify whether these data records d1-dM are benign or malicious. The disclosure allows the continuous data collection module 110 to continuously capture the data records d1-dM in a normally operating and controllable environment where only the benign subjects exist (i.e., the training environment supervised to ensure normal operations), so as to ensure that the data records d1-dM captured by the continuous data collection module 110 belong to all data that have been identified as related to the gray behavior of the benign subjects. In some embodiments, the benign subjects are the system individual software resources (e.g., the software programs or the firmware programs), the systems (e.g., the network systems, the wireless systems, or the communication systems) used by the users, or the enterprise assets themselves (e.g., the companies themselves, the factory, or the machines), which are non-abnormal (i.e., no attack behavior exists).

In some embodiments, the continuous data collection module 110 captures the data records d1-dM from a sample database SD. In some embodiments, the time in each of the data records d1-dM is time when the behavior data was captured. In some embodiments, the subject in each of the data records d1-dM is a subject that generated the behavior data. In some embodiments, each behavior data in each of the data records d1-dM is represented as numerical data. In some embodiments, each behavior type in each of the data records d1-dM is represented as one gray behavior policy (e.g., a policy that is jointly stored in an entire network domain), where the gray behavior policy is used for generating these behavior data. In some embodiments, each behavior type in each of the data records d1-dM has the corresponding activated state after being processed by activation functions described in subsequent paragraphs, where the activated state of each behavior type is represented by Boolean value.

In some embodiments, the sample database SD is any database (e.g., an open-source whitelist database that stores behavior features of applications or enterprise assets) that stores the data records d1-dM of the multiple benign subjects. In some embodiments, the continuous data collection module 110 is set up in an environment where only the benign subjects exist, so the continuous data collection module 110 collects the data records d1-dM from the multiple benign subjects in advance and stores the data records d1-dM in the sample database SD.

In some embodiments, the gray behavior policy is a policy that is jointly stored in the entire network domain (e.g., the policy is stored in all routers in the network domain) to which the anomaly detection device 100 is connected, and the gray behavior policy is, for example, times which a user touches in one hour, times which a user opens a page in one day, or times which a host continuously connects to the Internet. Multiple gray behavior policies are used for identifying the time, the subject, the multiple behavior types, and the multiple behavior data respectively corresponding to the multiple behavior types in all data records d1-dM from operating behaviors (e.g., an interface of a specific software program was touched five times within one hour at 10:00 on Mar. 1, 2020) of the multiple benign subjects. These behavior data in each of the data records d1-dM are regarded as a feature vector.

For example, the multiple behavior data include numerical data such as the user touching ten times in one hour, the user opening pages twenty times in one day, and the host continuously connecting to the Internet eighty times. These numerical data are regarded as the feature vector. The time is time (e.g., at 10:00 on Mar. 1, 2020) when these numerical data are generated. The subject is a subject (e.g., a specific software program) that generates these numerical data. The multiple behavior types represent the gray behavior policies such as the times which the user touches in one hour, the times which the user opens the page in one day, and the times which the host is continuously connected to the Internet.

In some embodiments, each behavior data corresponds to one of the gray behavior policies, and one of the gray behavior policies is used for generating corresponding behavior data.

For example, the above multiple gray behavior policies include a first gray behavior policy for the times which the user touches the page in one hour, a second gray behavior policy for the times which the user opens the page in one day, and a third gray behavior policy for the times which the host continuously connecting to the Internet. In a first embodiment, one benign subject, for example, is detected with two behavior data, including the user touching the page thirty times in one hour and the user opening the page twenty times in one day. In other words, the behavior of this benign subject is related to the first gray behavior policy and the second gray behavior policy.

In a second embodiment, another benign subject, for example, is detected with two other behavior data, including the user opening the page fifty times in one day and the host continuously connecting to the Internet eighty times. In other words, behavior of this benign subject is related to the second gray behavior policy and the third gray behavior policy.

In this embodiment, the memory 130 stores a machine learning models BM of multiple baseline behavior features and multiple instructions. The processor 120 executes detailed steps described in subsequent paragraphs based on these instructions. In some embodiments, the machine learning model BM is trained to identify whether the gray behavior is abnormal based on the multiple baseline behavior features, so the machine learning model BM is regarded as the machine learning model BM of the multiple baseline behavior features. The machine learning model BM of the multiple baseline behavior features and these instructions are corresponding software or firmware instruction programs. In some embodiments, these instructions further are software or firmware instruction programs of gray-behavior resident programs, where the software or firmware instruction programs of the gray-behavior resident programs are established on operating system hooks. In some embodiments, the machine learning model BM of the multiple baseline behavior features is any machine learning model (e.g., an artificial neural network model or a convolutional neural network model).

In some embodiments, the memory 130 has a verification database AD, which stores the multiple baseline behavior features (not shown in the figure), where multiple sets (hereinafter referred to as a baseline set) existed in the multiple baseline behavior features, each baseline set includes multiple behavior types detected from multiple other benign subjects (i.e., other subjects that have been previously identified as non-abnormal), and each baseline set is a set of behavior types generated by one of the other benign subjects based on the multiple gray behavior policies being preset. Specifically, the continuous data collection module 110 pre-captures multiple other data records of multiple other benign subjects, where each of the other data records also includes time, subject, multiple behavior types, and multiple behavior data respectively corresponding to multiple behavior types. Next, the processor 120 uses the multiple behavior types in each of the other data to be recorded as one of the baseline sets. In some embodiments, the other benign subjects are also the individual software resources of the system, the systems used by the user, or the enterprise assets themselves, which are non-abnormal. In some embodiments, the other benign subjects are the same as or different from the benign subjects in the above paragraphs.

First Embodiment of the Baseline Set in the Baseline Behavior Features

Figure 2:
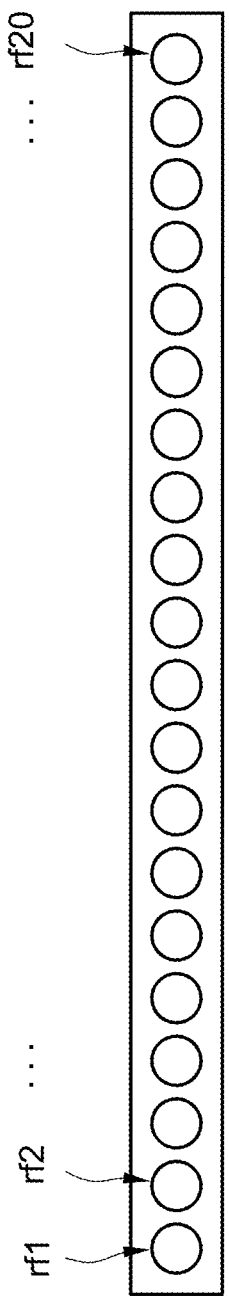
FIG. 2 is a schematic diagram of a baseline set in some embodiments of the disclosure.

The baseline set is explained below with a practical example. Reference is made to FIG. 2, and FIG. 2 is a schematic diagram of the baseline set rc in some embodiments of the disclosure. As shown in FIG. 2, the baseline set rc includes the multiple behavior types rf1-rf20. Behavior types rf1-rf20 represent multiple corresponding gray behavior policies.

In some embodiments, each baseline set further has a respective verification set. In some embodiments, each verification set has multiple verification values. In some embodiments, multiple verification values of each verification set are set by detecting the other benign subject corresponding to each baseline set based on multiple verification policies. For example, a management server or a distributed management server in the network domain detects the other benign subject used for generating one of the verification sets based on multiple verification policies, and generates a detection result, thereby generating the multiple verification values of one of the verification sets based on the detection result.

In some embodiments, the verification policy is a policy for managing and verifying the subject, such as whether the subject has a trusted electronic signature, whether the subject is established at a specific time, or whether an administrator logs into a main console of the subject. Therefore, the verification value is logical true or logical false (i.e., the verification value is a Boolean value with logical truth or logical fault).

Second Embodiment of the Baseline Set in the Baseline Behavior Features

Figure 3:
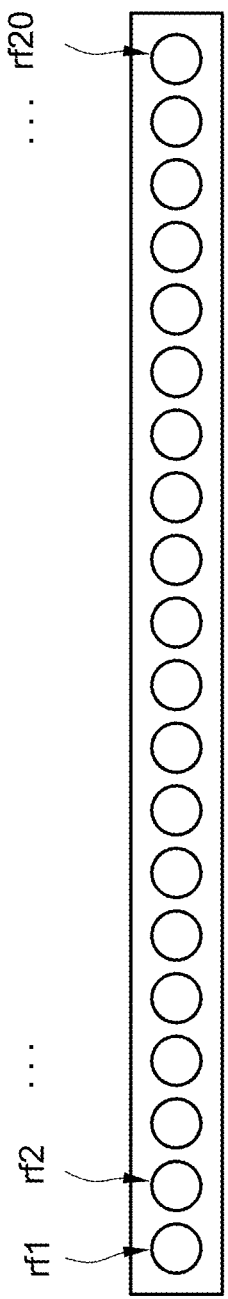
FIG. 3 is a schematic diagram of a verification set in some embodiments of the disclosure.

The verification set is explained below with a practical example. Reference is made to FIG. 3, and FIG. 3 is a schematic diagram of the verification set VC in some embodiments of the disclosure. As shown in FIG. 3, the baseline set rc further has the verification set VC, where the multiple verification values of the verification set VC are generated by detecting the other benign subject corresponding to the baseline set based on multiple verification policies.

Back to FIG. 1, in this embodiment, the memory 130 implements a learning function and a prediction function by the machine learning model BM. For the known subject, the learning function takes a set of behavior types of predefined length N as input, and adds the set to the multiple baseline behavior features to train the machine learning model BM. For the unknown test subject, the prediction function takes a new set of behavior types of the predefined length N as input, and outputs a matched status to determine whether the behavior of the test subject is abnormal. In some embodiments, N is less than or equal to a number of the multiple behavior types in the data record. The disclosure uses the predefined length N to enumerate the behavior types of the subject/test subject to perform the data augmentation. The learning function and the prediction function are further explained in subsequent paragraphs, so they will not be described further here.

In some embodiments, the continuous data collection module 110 is any data collection software, firmware, hardware, or a combination of the above. For example, the continuous data collection module 110 is one or a combination of a network interface that continuously monitors the network, a network card driver, a network application, a transmitter circuit, an analog-to-digital converter, a digital-to-analog converter, a low-noise amplifier, a mixer, a filter, an impedance matcher, a transmission line, a power amplifier, one or more antenna circuits, and local storage media components, but is not limited thereto. In some embodiments, the continuous data collection module 110 continuously observes and records the gray behavior of any subject during activity.

In some embodiments, the memory 130 is implemented by a flash memory, a read-only memory, a hard disk, or any equivalent storage component, but is not limited thereto. In some embodiments, the processor 120 is implemented by a central processing unit (CPU), a micro control unit (MCU), a programmable logic controller (PLC), a system on a chip (SoC), or a field programmable gate array (FPGA), but not limited thereto.

Embodiments of an Anomaly Detection Method Utilizing Data Augmentation

Figure 4:
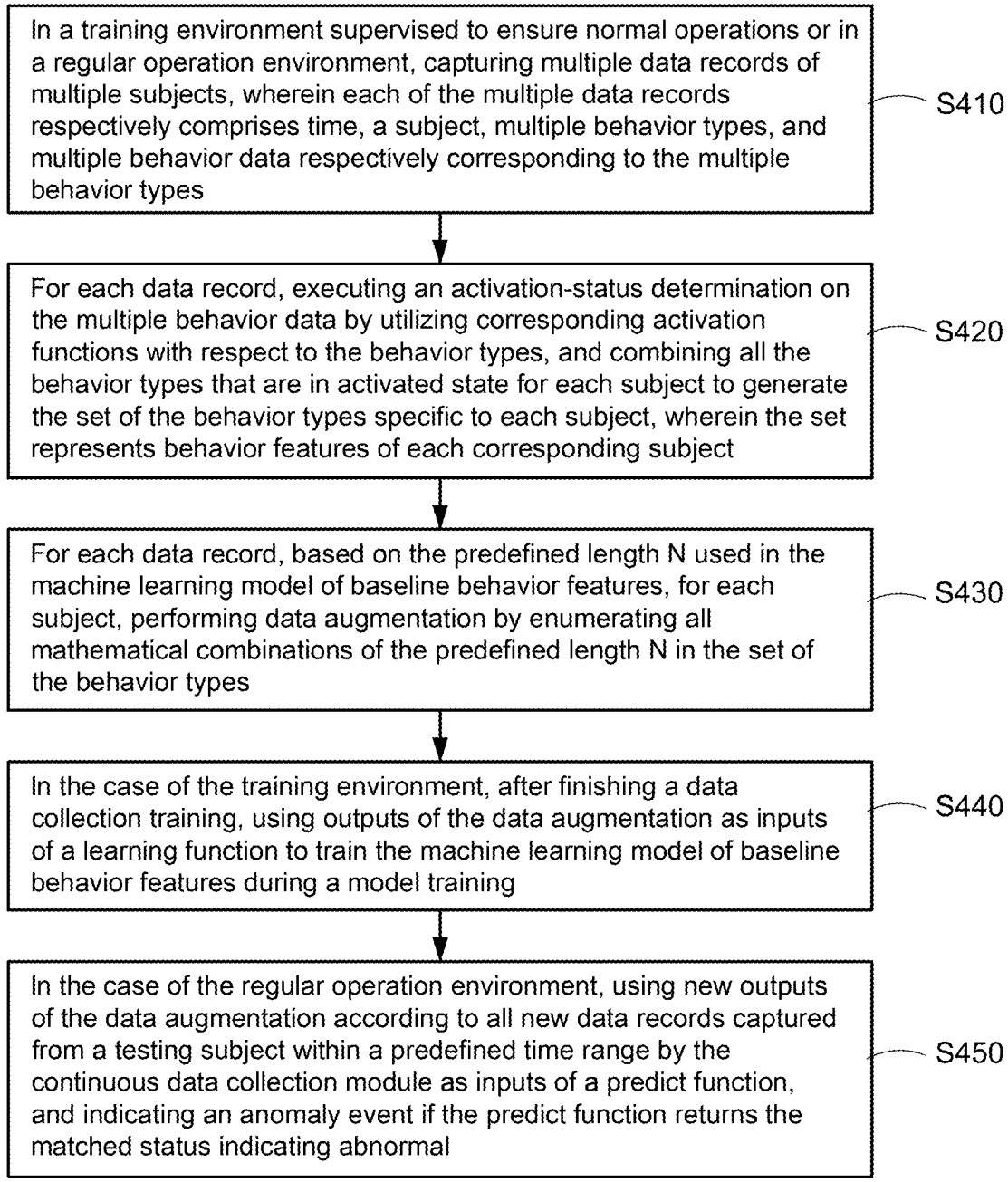
FIG. 4 is a flow chart of an anomaly detection method utilizing data augmentation in some embodiments of the disclosure.

Reference is made to FIG. 4, and FIG. 4 is a flow chart of the anomaly detection method utilizing data augmentation in some embodiments of the disclosure. This anomaly detection method is suitable for the anomaly detection device 100 shown in FIG. 1.

As shown in FIG. 4, the anomaly detection method includes steps S410-S440. First, in step S410, the continuous data collection module 110, in the training environment supervised to ensure normal operations or in the regular operation environment, captures the data records d1-dM of the multiple subjects. In this embodiment, as described in the above paragraph, each of the data records d1-dM includes the time, the subject, the multiple behavior types, and the multiple behavior data respectively corresponding to the multiple behavior types. In the training environment supervised to ensure normal operations, the continuous data collection module 110 captures the data records d1-dM in the sample database SD or the data records d1-dM of the benign subjects for the purpose of training the machine learning model BM. In the regular operation environment, the continuous data collection module 110 captures the data records d1-dM of the unknown subject for the purpose of detecting whether behavior of the unknown subject is abnormal.

In step S420, for each captured data record, the processor 120 executes an activation-status determination on the multiple behavior data by utilizing corresponding activation functions (i.e., one of the behavior types is related to one of the activation functions) with respect to the behavior types, and combines all the behavior types that are in the activated state for each subject to generate the set of the behavior types specific to each subject. In this embodiment, the set represents multiple behavior features of each corresponding subject. In other words, all the activated behavior types in the activated state in each data record are regarded as a set of the behavior types specific to the subject corresponding to each data record. In some embodiments, each activation function is used for executing the activation-status determination on the behavior data corresponding to the related behavior type (i.e., executes the activation-status determination in a one-to-one manner).

In some embodiments, the activation function is any type of an activation function (e.g., a unit step function, a rectified linear unit (ReLU), a SoftMax function, or a behavior feature comparison function (i.e., conforming to preset behavior features means conforming to the activated state)). In other words, the activation function is a function for comparing a threshold, or a function for comparing whether data meets the preset behavior features (e.g., turning on the computer ten times). It should be noted that an effect of the activation function is to convert observed numerical data (heterogeneous numerical distributions of different gray behaviors) of the gray behavior into homogeneity that is used for representing the set of the behavior types.

For example, assuming the behavior data is that the user touches ten times in one hour and the activation function is a unit step function that is one for greater than five and zero for no greater than five, this behavior data is converted to one after being processed by this unit step function. Therefore, the behavior type (i.e., the times which the user touches in one hour) corresponding to this behavior data is regarded as in the activated state (i.e., the activated state of the behavior type represents a Boolean value with a logical value of one) and is included in the above set. In another example, assuming that the behavior data is that the user opens the page twice in one day and the activation function is a unit step function that one for greater than three and zero for no greater than three, this behavior data is converted to zero after being processed by this unit step function. Therefore, the behavior type (i.e., the times which the user opens the page in one day) corresponding to this behavior data is regarded as in the inactivated state (i.e., the activated state of the behavior type represents a Boolean value with a logical value of zero) and is not included in the above set. In another example, assuming that the activation function is a behavior feature comparison function, this behavior feature comparison function compares preset behavior features with the behavior data. When the preset behavior features match the behavior data, the behavior type corresponding to this behavior data is regarded as in the activated state and included in the above set; conversely, when the preset behavior features do not match the behavior data, the behavior type corresponding to this behavior data is regarded as in inactivated state and is not included in the above set.

Figure 5:
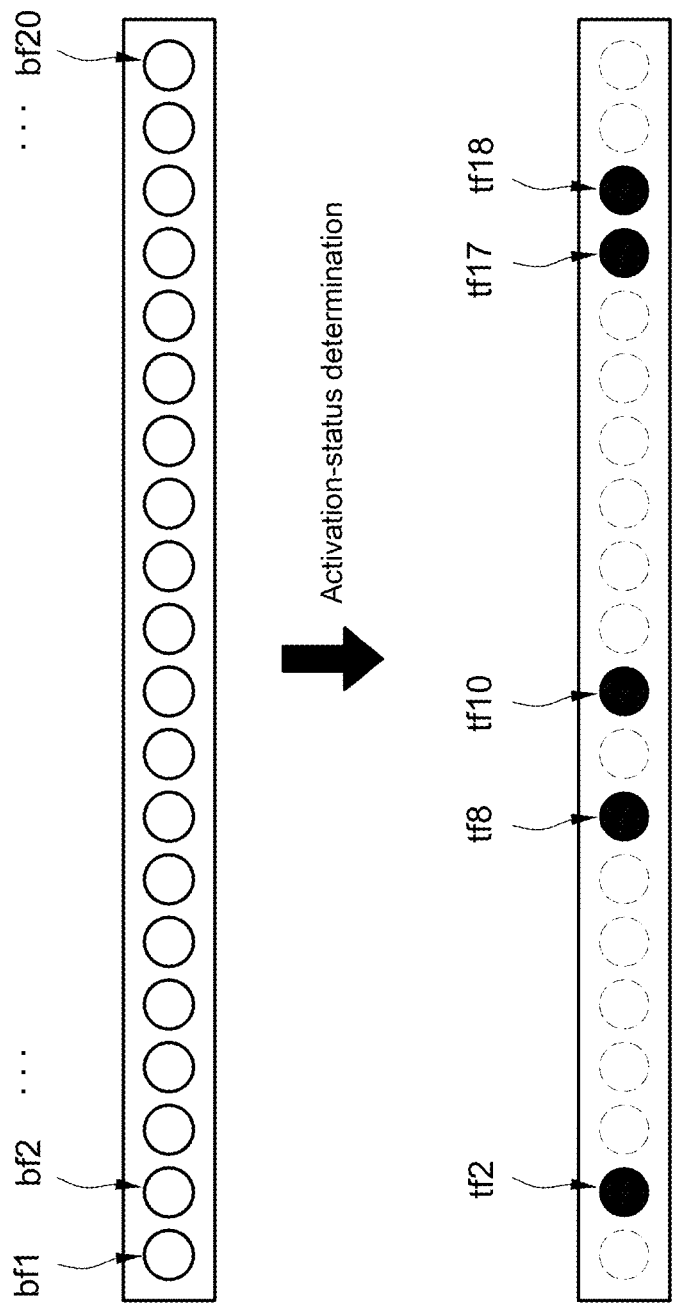
FIG. 5 is a schematic diagram of performing activation-status determination on multiple behavior data in some embodiments of the disclosure.

A relationship between the behavior data and a set of behavior types specific to one of the subjects is explained below with a practical example. Reference is made to FIG. 5, and FIG. 5 is a schematic diagram of performing the activation-status determination on the multiple behavior data bf1-bf20 in some embodiments of the disclosure. As shown in FIG. 5, after the above activation-status determination using the multiple activation functions, the processor 120 obtains the behavior types tf2, tf8, tf10, and tf17-tf18 in the activated state from the multiple behavior data bf1-bf20, where behavior types tf2, tf8, tf10, and tf17-tf18 respectively correspond to behavior data bf2, bf8, bf10, and bf17-bf18. In other words, the fifteen behavior types respectively corresponding to the behavior data bf1, bf3-bf7, bf9, bf11-bf16, and bf19-bf20 have been removed by respective corresponding activation functions. The behavior types tf2, tf8, tf10, and tf17-tf18 are regarded as the above set of the behavior types specific to the subject, which means that this set includes the five behavior types tf2, tf8, tf10, tf17, and tf18 in the activated state.

Back to FIG. 4, in step S430, for each data record, the processor 120, based on the predefined length N used in the machine learning model BM of baseline behavior features, for each subject, performs the data augmentation by enumerating all mathematical combinations of the predefined length N in the set of the behavior types. In this embodiment, each mathematical combination is a subset, of the predefined length N, of the behavior features of the subject. In some embodiments, N is any positive integer greater than or equal to 1. For example, when the set of behavior types includes five behavior types and the predefined length N is 3, the processor 120 needs to enumerate all mathematical combinations of any three behavior types selected from the five behavior types in the activated state (i.e., the number of all mathematical combinations is $$C_3^5).$$

In some embodiments, all mathematical combinations are regarded as a hybrid combination, that is, the gray behaviors occurring in any order in the future are directly inferred and gray behavior fragments are observed. In some embodiments, the processor 120 adds above all mathematical combinations to multiple baseline behavior features for updating. In some embodiments, the processor 120 adds the mathematical combination(s) that is/are different from the multiple baseline behavior features to the multiple baseline behavior features for updating.

It should be noted that if the predefined length N gets greater, in subsequent paragraphs, all behavior types in new data record are identified as non-abnormal (appropriate predefined length N has a better detection rate and a lower false alert rate in subsequent anomaly identification) only in the case of the behavior types having a higher degree of similarity with the data records d1-dM; if the predefined length N is lower, even if all behavior types in the new data record have a lower degree of similarity with the data records d1-dM, the behavior types still are possibly identified as non-abnormal (i.e., sensitivity).

In some embodiments, for each data record, the processor 120, based on multiple predefined length N used in the machine learning model BM of baseline behavior features, for each subject, performs the data augmentation by enumerating respective mathematical combinations of each predefined length N in the set of the behavior types. In some embodiments, the multiple predefined lengths N are all positive integers in any numerical interval (e.g., the multiple predefined lengths N are all positive integers less than ten, any positive integer greater than two and less than a number of all behavior types in the activated state, or all positive integers less than ten and greater than one).

It should be noted that if an upper limit of the numerical interval gets greater, in subsequent paragraphs, all behavior types in the new data record are possibly identified as non-abnormal (an appropriate upper limit has the better detection rate and the lower false alert rate in subsequent anomaly identification) only in the case of the behavior types in the new data record having a higher degree of similarity with the data records d1-dM; if a lower limit of the numerical interval gets lower, even if all behavior types in the new data record have a low degree of similarity with the data records d1-dM, the behavior types in the new data record still can be identified as non-abnormal (i.e., sensitivity). The above process of enumerating the combinations is a common technique in the field of mathematics and will not be described further here.

For example, when the numerical interval is all positive integers less than four and the number of all behavior types in the activated state is five, the processor 120 enumerates all mathematical combinations of three behavior types in the activated state from five behavior types in the activated state as a first set (i.e., a number of the mathematical combinations is $$C_3^5).$$

Next, the processor 120 enumerates all mathematical combinations of two behavior types in the activated state from the five behavior types in the activated state as a second set (i.e., a number of the mathematical combinations is $$C_2^5).$$

Next, the processor 120 enumerates all mathematical combinations of one behavior type in the activated state from the five behavior types in the activated state as a third set (i.e., a number of the mathematical combinations is $$C_1^5).$$

At this time, a total number of all mathematical combinations (i.e., the above multiple sets) is twenty-five (i.e., $$C_3^5 + C_2^5 + C_1^5),$$

and such a selection manner has a best detection rate and a lowest false alert rate in subsequent anomaly identification.

In addition, in another example, when the numeral interval is all positive integers less than two and a number of the behavior types in the activated state is five, the processor 120 enumerates all mathematical combinations of one behavior type in the activated state from the five behavior types in the activated state as a set (i.e., the number of the mathematical combinations is $$C_1^5).$$

At this time, a total number of all mathematical combinations of the behavior types in the activated state is five (i.e., $$C_1^5).$$

Such a selection manner is similar to an effect of a traditional whitelist.

Embodiments of all Mathematical Combinations of the Predefined Length N

Figure 6:
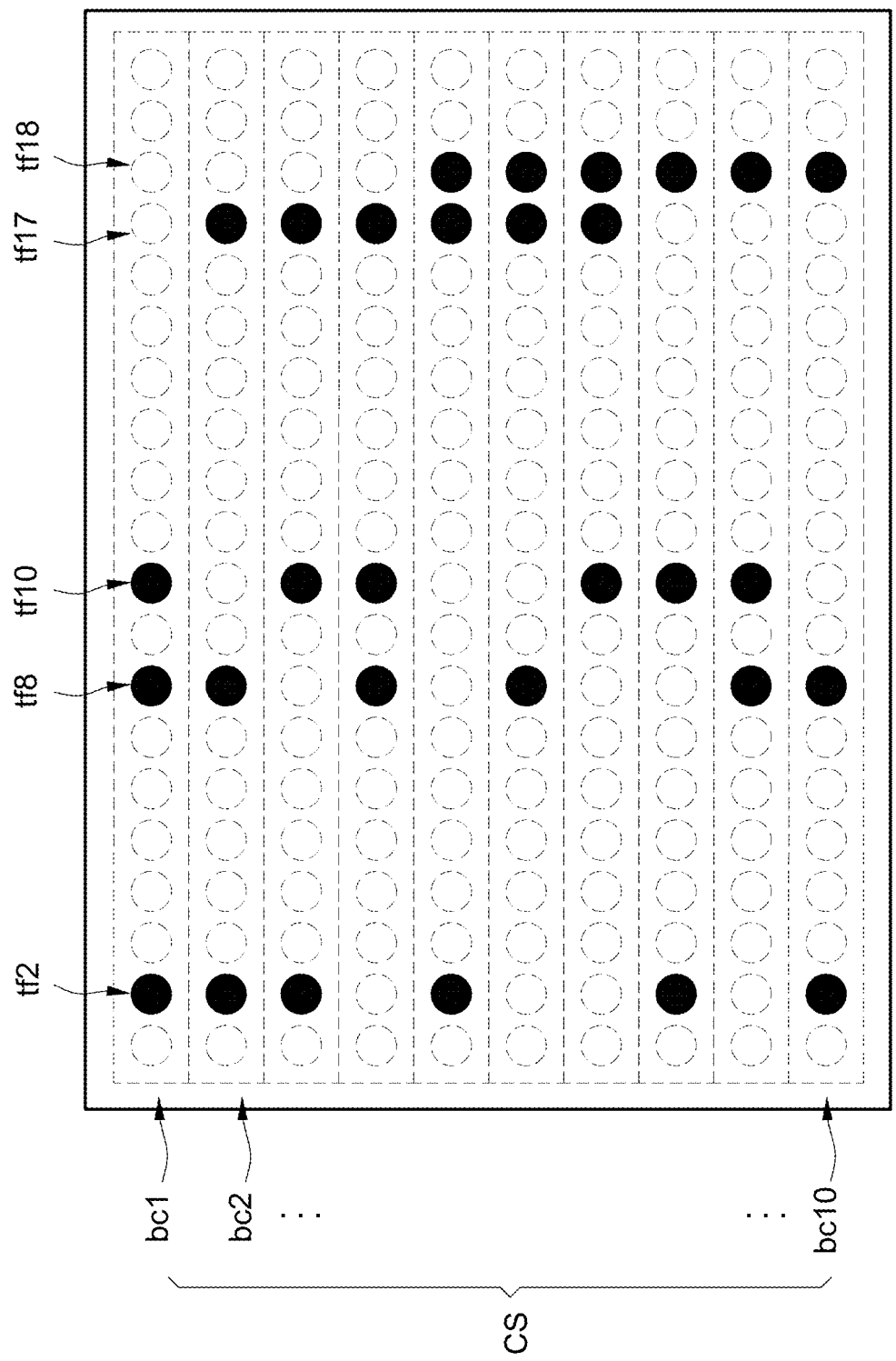
FIG. 6 is a schematic diagram of generating a set of mathematical combinations in some embodiments of the disclosure.

All mathematical combinations of the predefined length N are explained below with a practical example. Reference is made to FIG. 6, and FIG. 6 is a schematic diagram of generating the set cs of the mathematical combinations in some embodiments of the disclosure. As shown in FIG. 6, continuing the example of FIG. 5, when the predefined length N is 3, the processor 120 performs a mathematical combination process of choosing three out of five from the behavior types tf2, tf8, tf10, and tf17-tf18 (i.e., the above behavior types in the activated state) from the set cs of the mathematical combinations to enumerate the mathematical combinations bc1-bc10 of ten behavior types in the activated state (i.e., a number is $$C_3^5).$$

The mathematical combination bc1 of the behavior types in the activated state includes the behavior types tf2, tf8, and tf10. The mathematical combination bc2 of the behavior types in the activated state includes the behavior types tf2, tf8, and tf17. The mathematical combination bc3 of the behavior types in the activated state includes the behavior types tf2, tf10, and tf17. The mathematical combination bc4 of the behavior types in the activated state includes the behavior types tf8, tf10, and tf17. The mathematical combination bc5 of the behavior type in the activated state includes the behavior types tf2 and tf17-tf18. The mathematical combination bc6 of the behavior type in the activated state includes the behavior types tf8 and tf17-tf18. The mathematical combination bc7 of the behavior types in the activated state includes the behavior types tf10 and tf17-tf18. The mathematical combination bc8 of the behavior types in the activated state includes the behavior types tf2, tf10, and tf18. The mathematical combination bc9 of the behavior types in the activated state includes the behavior types tf8, tf10, and tf18. The mathematical combination bc10 of the behavior types in the activated state includes behavior types tf2, tf8, and tf18.

In some embodiments, each of these mathematical combinations also has a respective verification set, the verification set of the mathematical combination also includes multiple verification values, and these verification values are also generated by detecting the subject (i.e., the above corresponding benign subject) corresponding to all mathematical combinations based on the verification policy. It should be noted that generating these verification values of the mathematical combination is similar to generating these verification values of the baseline set, and therefore will not be described further here.

Figure 7:
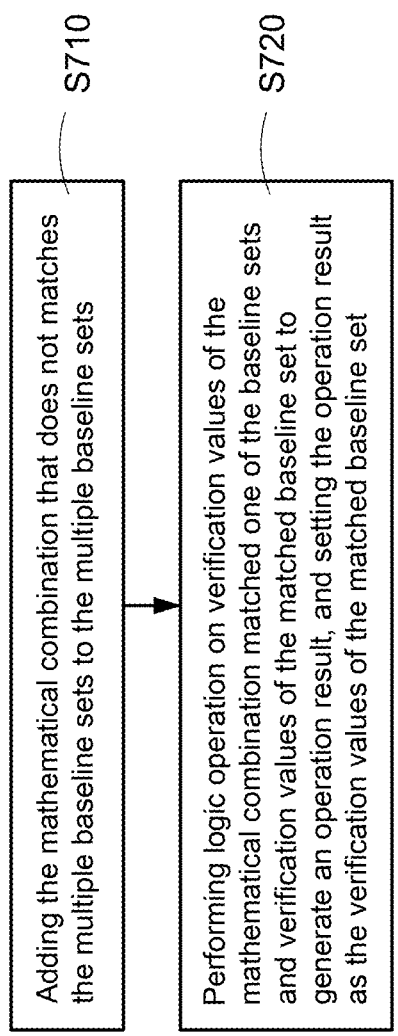
FIG. 7 is a flowchart of detailed steps of further steps included in the anomaly detection method utilizing data augmentation in some embodiments.

Embodiment of Updating the Mathematical Combination in the Verification Database Reference is made to FIG. 7, and FIG. 7 is a flow chart of steps S710-S720 executed after step S430 in some embodiments of the disclosure.

As shown in FIG. 7, in step S710, the processor 120 adds the mathematical combination that does not match the multiple baseline sets to the multiple baseline sets. In detail, whenever the processor 120 cannot find the mathematical combination same as one of the baseline sets in the verification database AD, the processor 120 uses the mathematical combination as a new baseline set. In this way, the processor 120 stores the new baseline set and multiple verification values of the new baseline set in the verification database AD. Thereby, the processor 120 adds the new baseline set and its verification values into the verification database AD. On the contrary, if the processor 120 determines that the mathematical combination matches any stored baseline set, the processor 120 updates the multiple verification values of the matched baseline set in subsequent paragraphs.

In step S720, the processor 120 performs logical operation (e.g., "AND" operation) on verification values of the mathematical combination matched one of the baseline sets and verification values of the matched baseline set to generate an operation result, and sets the operation result as the verification values of the matched baseline set. In detail, whenever a baseline set in the verification database AD is found to be same as one of the mathematical combinations, the processor 120 uses the multiple verification values of the baseline set to perform the logical operations with the multiple verification values of the one of the mathematical combinations to generate the operation result, and uses this operation result as the multiple verification values of this baseline set. That is, by using the operation result of such the logical operation based on inductive generalization, this result is used for verifying a verification item list being "minimum and necessary" for these subsets (i.e., the subset of the predefined length N of the multiple behavior features of the subject) of the gray behaviors.

Through the above steps, the anomaly detection device 100 further updates the multiple verification values of the baseline set by comparing all mathematical combinations with the baseline set. In this way, the multiple baseline sets in the multiple baseline behavior features in the verification database AD are used for further verifying (i.e., completing access verification) the subjects in the network domain of the zero-trust environment.

Embodiments of Training the Machine Learning Model

Back to FIG. 4, in step S440, in the case of the training environment supervised to ensure normal operations, after finishing a data collection training, the processor 120 uses outputs of the data augmentation as inputs of the learning function to train the machine learning model BM of baseline behavior features during a model training. In other words, the entire training includes the data collection training and the model training. In some embodiments, once the training (i.e., the above data collection and data augmentation) is completed, during the model training, the processor 120 uses the learning function to treat all mathematical combinations generated by the data augmentation as multiple training samples, and use these training samples to train the machine learning model BM of baseline behavior features. In this way, the processor 120 uses the trained machine learning model BM of baseline behavior features to identify whether captured data (i.e., the new data records described in following paragraphs) is abnormal. In other words, the trained machine learning model BM of baseline behavior features is used for identifying whether unidentified gray behavior belongs to the gray behavior of the benign subject. In some embodiments, the above model training is a phase in which the data records d1-dM are stopped to be collected to train the machine learning model BM.

Embodiments of Using the Machine Learning Model

In step S450, in the case of the regular operation environment, the processor 120 uses new outputs of the data augmentation according to all new data records captured from a testing subject within a predefined time range (e.g., presetting by the user) by the continuous data collection module 110 as inputs of the predict function, and indicates an anomaly event (i.e., one of the new data records is abnormal) if the predict function returns the matched status indicating abnormal. In some embodiments, the processor 120 uses the machine learning model BM of baseline behavior features to detect the test subject and provides an anomaly alert (e.g., a sound or information display alert).

In some embodiments, the anomaly detection device 100 utilizing data augmentation further includes a user interface 140. The user interface 140 is used for setting the gray behavior policy and selecting an operation mode of the processor 120 as a learning mode, a detection mode, or an offline mode (i.e., adjust the operation of the anomaly detection device 100).

In some embodiments, when the user interface 140 selects the operation mode as the offline mode, the processor 120 stops running. In other words, once the operation mode is switched to the offline mode, the anomaly detection device 100 stops operating. In some embodiments, when the user interface 140 selects the operation mode as the learning mode or the detection mode, the processor 120 activates the continuous data collection module 110.

In some embodiments, an operation that the user interface 140 selects the operation mode as the learning mode represents that the processor 120 operates in the training environment supervised to ensure normal operations and starts training the machine learning model BM of baseline behavior features. In other words, when the operation mode is selected as the learning mode, the processor 120 runs in the training environment supervised to ensure normal operations (i.e., the user wants to run the anomaly detection device 100 in the training environment supervised to ensure normal operations), and then starts training the machine learning model BM.

In some embodiments, an operation that the user interface 140 changes the operation mode from the learning mode to the detection mode or the offline mode represents completing the data collection training once, and indicates that the processor 120 uses the data records (d1-dM) collected during the data collection training to perform the data augmentation and train the machine learning model BM. In other words, when the operation mode is switched from the learning mode to the detection mode or the offline mode, the processor 120 completes the data collection training (i.e., the processor 120 collects the data records through the continuous data collection module 110), and then trains the machine learning model BM during model training (i.e., beginning to train the machine learning model BM using the data of the data augmentation).

In some embodiments, an operation that the user interface 140 selects the operation mode as the detection mode represents that the processor 120 is running in the regular operation environment, and indicates that the processor 120 uses the trained machine learning model BM to perform anomaly detection. In other words, when the operation mode is selected as the detection mode, the processor 120 starts to run in the regular operation environment (i.e., the user wants to run the anomaly detection device 100 in the regular operation environment), and then uses the trained machine learning model BM to perform the anomaly detection on the new data records in a regular operation environment. In some embodiments, when the user interface 140 selects the operation mode as the learning mode again so that the processor 120 executes a new training, the processor 120 adds new baseline behavior features to the baseline behavior features during the new training (i.e., accumulated into the machine learning model BM).

Figure 8:
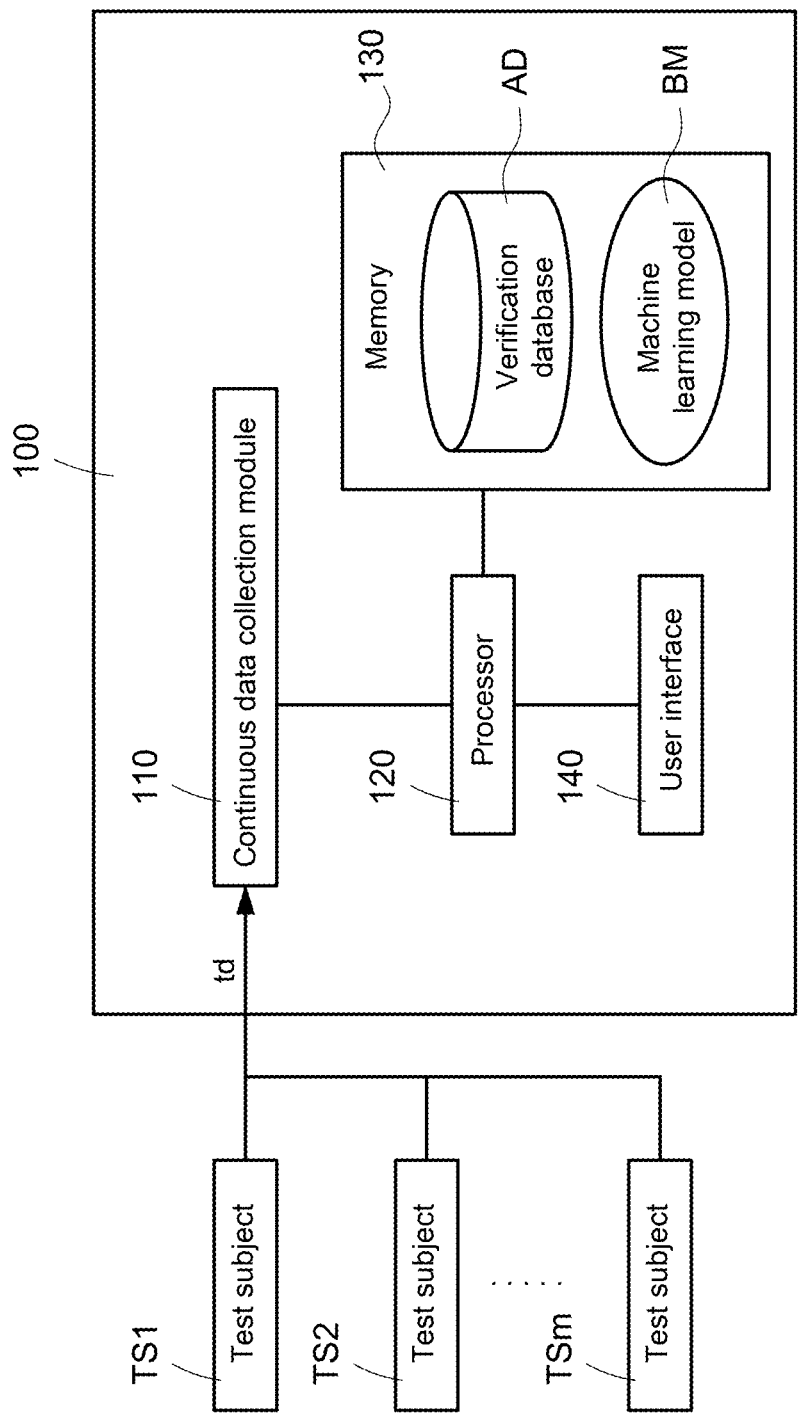
FIG. 8 is a block diagram of the anomaly detection device utilizing data augmentation in other embodiments of the disclosure.

Detecting the abnormal event is described below with a practical example. Reference is made to FIG. 8, and FIG. 8 is a block diagram of the anomaly detection device 100 utilizing data augmentation in other embodiments of the disclosure. The anomaly detection device 100 in FIG. 8 is the same as the anomaly detection device 100 in FIG. 1, and will not be described further here.

As shown in FIG. 8, the continuous data collection module 110 is connected to multiple test subjects TS1-TSm. In some embodiments, m is any positive integer and is not particularly limited. In this embodiment, the continuous data collection module 110 further captures a new data record td from any test subject under the regular operation environment. In some embodiments, each of the test subjects TS1-TSm also is the individual software resource of abnormal or non-abnormal systems, the abnormal or non-abnormal system used by the user, or the abnormal or non-abnormal enterprise asset itself. It should be noted that content of the new data record td is basically similar to the content of the data records d1-dM, so it will not be described further here.

The difference between the embodiment of FIG. 8 and the embodiment of FIG. 1 is that FIG. 8 is applied in an unspecific environment (e.g., a conventional operation environment), and benign subjects and malicious subjects may co-exist in this unspecified environment. In other words, the test subjects TS1-TSm are subjects that have not yet been identified to be abnormal or non-abnormal. That is to say, the test subjects TS1-TSm may or may not have aggressive behavior, so identifying whether behavior of these test subjects TS1-TSm is abnormal by capturing the new data records td is necessary.

In some embodiments, the processor 120 uses the prediction function to input the new data record td into the machine learning model BM of baseline behavior features to identify whether the new data record td is abnormal, thereby generating the anomaly alert when the new data record td is abnormal. In other words, once the matched status returned by the prediction function is abnormal, the processor 120 knows that the new data record td belongs to the gray behavior being abnormal, thereby generating the anomaly alert to notify the user.

Embodiments of Testing the Test Subject

Figure 9:
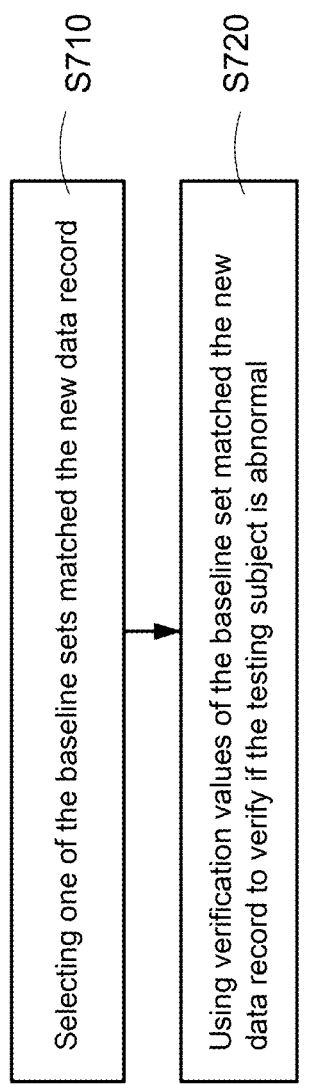
FIG. 9 is a flowchart of detailed steps of further steps included in the anomaly detection method utilizing data augmentation in other embodiments of the disclosure.

Reference is made to FIG. 9, and FIG. 9 is a flow chart of steps S910-920 executed after step S450 in some embodiments of the disclosure. As shown in FIG. 9, in step S910, the processor 120 selects one of the baseline sets matched the new data record td. In some embodiments, the processor 120 compares whether the multiple behavior types in the new data record are the same as the multiple behavior types in one of the baseline sets. When the multiple behavior types in the new data record are the same as the multiple behavior types in one of the baseline sets, the processor 120 determines that one of the baseline sets matches the new data record. When the multiple behavior types in the new data record are different from the multiple behavior types in one of the baseline sets, the processor 120 determines that the test subject that generates the new data record is a malicious subject.

In step S920, the processor 120 uses verification values of the baseline set matched the new data record to verify if the testing subject is abnormal. In some embodiments, the processor 120 verifies the test subject by using the verification policy corresponding to the verification value with a verification true (i.e., the verification value is a logical value with "true") of the matched baseline set. When at least one verification value generated from the test subject is logical false, the processor 120 determines that the test subject is abnormal. On the contrary, when all verification values generated from the test subject are logical true, the processor 120 determines that the test subject is non-abnormal.

For example, assuming that a first verification value being logical true and a second verification value being logical true exist, the first verification value being logical true and the second verification value being logical true respectively correspond to whether the subject has the trusted electronic signature (i.e., a first verification policy) and whether at the specific time (e.g., ten o'clock in the morning) the subject is established (i.e., a second verification policy). For example, the first verification value being logical true indicates that the subject has the trusted electronic signature, and the second verification value being logical true indicates that the subject is established at the specific time.

Based on this, the processor 120 determines whether the test subject generates two verification values being logical true based on the first verification policy and the second verification policy. In other words, the processor 120 verifies whether the test subject has the trusted electronic signature to generate the first verification value, and then verifies whether the test subject is established at the specific time to generate the second verification value. Next, when the first verification value and the second verification value are both logical true, the processor 120 determines that the test subject matches the first verification value being logical true and the second verification value being logical true, so as to determine the test subject to be non-abnormal. On the contrary, when any one of the first verification value and the second verification value is not logical true, the processor 120 determines that the test subject does not match the first verification value being logical true and the second verification value being logical true, so as to determine the test subject to be abnormal.

Through the above steps, the anomaly detection device 100 further verifies whether the test subject is abnormal (i.e., identifying the benign subject not having the attack behavior or the malicious subject possibly having the attack behavior) through the multiple verification values of the baseline set. Therefore, the multiple verification values of the baseline set in the verification database AD are used for further verifying the test subjects in the network domain of the zero-trust environment. This greatly improves the accuracy of anomaly detection for the subjects with the gray behavior.

In summary, the disclosure generates the multiple mathematical combinations based on one or more behavior types in the activated state through the combination process. In this way, the very large number of the mathematical combinations are generated from the relatively small number of the sets of the behavior types to achieve the purpose of the data augmentation. Therefore, the disclosure uses the very large number of the mathematical combinations for the anomaly detection in the zero-trust environment. Furthermore, the machine learning model of baseline behavior features in the disclosure also is used for further verifying the data in the network domain of the zero-trust environment. The verification values in the multiple baseline behavior features are used for further verifying the subjects in the network domain of the zero-trust environment. Based on the above, the anomaly detection device and method utilizing data augmentation proposed in the disclosure greatly save the human resources of collecting data and greatly improve the accuracy of the anomaly detection of the gray behaviors.

While this disclosure has been described by means of specific embodiments, numerous modifications and variations may be made thereto by those skilled in the art without departing from the scope and spirit of this disclosure set forth in the claims.

What is claimed is:

1. An anomaly detection device by utilizing data augmentation, comprising:
   a continuous data collection module, configured in a training environment supervised to ensure normal operations or in a regular operation environment, for capturing a plurality of data records of a plurality of subjects, wherein each of the plurality of data records respectively comprises time, a subject, a plurality of behavior types, and a plurality of behavior data respectively corresponding to the plurality of behavior types;
   a memory, configured for storing a plurality of instructions and a machine learning model of baseline behavior features, which implements:
   a) a learning function that takes a set of the behavior types of predefined length N as input, and adds the set to the baseline behavior features;
   b) a predict function that takes a new set of the behavior types of the predefined length N as input, and outputs a matched status;
   a processor, connected to the continuous data collection module and the memory, and configured for executing the plurality of instructions to execute following steps for each of the plurality of data records:
   executing an activation-status determination on the plurality of behavior data by utilizing corresponding activation functions with respect to the behavior types, and combining all the behavior types that are in activated state for each subject to generate the set of the behavior types specific to each subject, wherein the set represents behavior features of each corresponding subject;
   based on the predefined length N used in the machine learning model of baseline behavior features, for each subject, performing data augmentation by enumerating all mathematical combinations of the predefined length N in the set of the behavior types, wherein each of the mathematical combinations is a subset, of the predefined length N, of the behavior features of the subject;
   in the case of the training environment, after finishing a data collection training, using outputs of the data augmentation as inputs of the learning function to train the machine learning model of baseline behavior features during a model training; and
   in the case of the regular operation environment, using new outputs of the data augmentation according to all new data records captured from a testing subject within a predefined time range by the continuous data collection module as inputs of the predict function, and indicating an anomaly event if the predict function returns the matched status indicating abnormal.

2. The anomaly detection device in claim 1, wherein the continuous data collection module is configured for capturing the plurality of data records of a plurality of benign subjects in the training environment supervised to ensure normal operations, wherein the benign subjects are system individual software resources, systems used by users, or enterprise assets, which are non-abnormal.

3. The anomaly detection device in claim 1, wherein each behavior data represents a numeric data, each behavior type represents one gray behavior policy, and the activated state of each behavior type represents a Boolean value, wherein the gray behavior policy is used for generating the plurality of behavior data.

4. The anomaly detection device in claim 1, further comprising:
   a user interface, configured for setting a gray behavior policy, and selecting an operation mode of the processor as a learning mode, a detection mode, or an offline mode,
   wherein when the user interface selects the operation mode as the offline mode, the processor stops running,
   wherein when the user interface selects the operation mode as the learning mode or the detection mode, the processor activates the continuous data collection module,
   wherein an operation that the user interface selects the operation mode as the learning mode represents that the processor operates in the training environment supervised to ensure normal operations and starts training the machine learning model of baseline behavior features,
   wherein an operation that the user interface changes the operation mode from the learning mode to the detection mode or the offline mode represents completing the data collection training once, and indicates that the processor uses the data records collected during the data collection training to perform the data augmentation and train the machine learning model,
   wherein an operation that the user interface selects the operation mode as the detection mode represents that the processor is running in the regular operation environment, and indicates that the processor uses the trained machine learning model to perform anomaly detection,
   wherein when the user interface selects the operation mode as the learning mode again so that the processor executes a new training, the processor adds new baseline behavior features to the baseline behavior features during the new training.

5. The anomaly detection device in claim 1, wherein in the step of using the new outputs of the data augmentation according to all new data records captured from the testing subject within the predefined time range by the continuous data collection module as the inputs of the predict function, and indicating the anomaly event if the predict function returns the matched status indicating abnormal, the processor is configured for executing following steps:
   using the machine learning model of baseline behavior features to detect the testing subject and provide an anomaly alert.

6. The anomaly detection device in claim 1, wherein a plurality of baseline sets is in the baseline behavior features, and the processor is further configured for executing following steps:
   adding the mathematical combination that does not match the plurality of baseline sets to the plurality of baseline sets; and
   performing logic operation on verification values of the mathematical combination that match one of the baseline sets and verification values of the matched baseline set to generate an operation result, and setting the operation result as the verification values of the matched baseline set.

7. The anomaly detection device in claim 1, wherein a plurality of baseline sets is in the baseline behavior features, and the processor is further configured for executing following steps:

selecting one of the baseline sets matched the new data record; and using verification values of the baseline set that match the new data record to verify if the testing subject is abnormal.

8. An anomaly detection method by utilizing data augmentation, comprising:

by a continuous data collection module, in a training environment supervised to ensure normal operations or in a regular operation environment, capturing a plurality of data records of a plurality of subjects, wherein each of the plurality of data records respectively comprises time, a subject, a plurality of behavior types, and a plurality of behavior data respectively corresponding to the plurality of behavior types;

for each of the plurality of data records, by a processor, executing an activation-status determination on the plurality of behavior data by utilizing corresponding activation functions with respect to the behavior types, and combining all the behavior types that are in activated state for each subject to generate a set of the behavior types specific to each subject, wherein the set represents behavior features of each corresponding subject;

for each of the plurality of data records, by the processor, based on a predefined length N used in a machine learning model of baseline behavior features, for each subject, performing data augmentation by enumerating all mathematical combinations of the predefined length N in the set of the behavior types, wherein each of the mathematical combinations is a subset, of the predefined length N, of the behavior features of the subject;

in the case of the training environment, after finishing a data collection training, by the processor, using outputs of the data augmentation as inputs of a learning function to train the machine learning model of baseline behavior features during a model training, wherein the learning function takes the set of the behavior types of the predefined length N as input, and adds the set to the baseline behavior features; and in the case of the regular operation environment, by the processor, using new outputs of the data augmentation according to all new data records captured from a testing subject within a predefined time range by the continuous data collection module as inputs of a predict function, and indicating an anomaly event if the predict function returns a matched status indicating abnormal, wherein the predict function takes a new set of new behavior types of the predefined length N as input, and outputs the matched status.

9. The anomaly detection method in claim 8, wherein the continuous data collection module is configured for capturing the plurality of data records of a plurality of benign subjects in the training environment supervised to ensure normal operations, wherein the benign subjects are system individual software resources, systems used by users, or enterprise assets, which are non-abnormal.

10. The anomaly detection method in claim 8, wherein each behavior data represents a numeric data, each behavior type represents one gray behavior policy, and the activated state of each behavior type represents a Boolean value, wherein the gray behavior policy is used for generating the plurality of behavior data.

11. The anomaly detection method in claim 8, further comprising:

by a user interface, setting a gray behavior policy, and selecting an operation mode of the processor as a learning mode, a detection mode, or an offline mode;

when, by the user interface, selecting the operation mode as the offline mode, the processor stopping running;

when, by the user interface, selecting the operation mode as the learning mode or the detection mode, the processor activating the continuous data collection module, wherein a step of selecting the operation mode as the learning mode by the user interface represents that the processor operates in the training environment supervised to ensure normal operations and starts training the machine learning model of baseline behavior features, wherein a step of changing the operation mode from the learning mode to the detection mode or the offline mode operation by the user interface represents completing the data collection training once, and indicates using the data records collected during the data collection training to perform the data augmentation and train the machine learning model by the processor, wherein a step of selecting the operation mode as the detection mode operation by the user interface represents that the processor is running in the regular operation environment, and indicates that the processor uses the trained machine learning model to perform anomaly detection; and when, by the user interface, selecting the operation mode as the learning mode again so that the processor executes a new training, adding new baseline behavior features to the baseline behavior features during the new training by the processor.

12. The anomaly detection method in claim 8, wherein the step of by the processor, using new outputs of the data augmentation according to all new data records captured from the testing subject within a predefined time range by the continuous data collection module as the inputs of the predict function, and indicating the anomaly event if the predict function returns the matched status indicating abnormal comprises:

by the processor, using the machine learning model of baseline behavior features to detect the testing subject and provide an anomaly alert.

13. The anomaly detection method in claim 8, wherein a plurality of baseline sets is in the baseline behavior features, and the anomaly detection method further comprises:

by the processor, adding the mathematical combination that does not match the plurality of baseline sets to the plurality of baseline sets; and by the processor, performing logic operation on verification values of the mathematical combination that match one of the baseline sets and verification values of the matched baseline set to generate an operation result, and setting the operation result as the verification values of the matched baseline set.

14. The anomaly detection method in claim 8, wherein a plurality of baseline sets is in the baseline behavior features, and the anomaly detection method further comprises:

by the processor, selecting one of the baseline sets matched the new data record; and by the processor, using verification values of the baseline set that match the new data record to verify if the testing subject is abnormal.

* * * * *